(12) United States Patent
Poeting

(10) Patent No.: US 6,345,939 B1
(45) Date of Patent: Feb. 12, 2002

(54) APPARATUS FOR MACHINING, ESPECIALLY DRILLING OF STRUCTURAL SHAPES

(75) Inventor: Reiner Poeting, Bradley, IL (US)

(73) Assignee: Peddinghaus Anlagen + Maschinen GmbH, Gevelsberg (DE)

(*) Notice: Subject to any disclaimer, the term of this patent is extended or adjusted under 35 U.S.C. 154(b) by 0 days.

(21) Appl. No.: 09/505,907

(22) Filed: Feb. 17, 2000

(51) Int. Cl.[7] ............................................. B23B 39/16
(52) U.S. Cl. ............................ 408/38; 408/36; 408/37; 408/43; 408/236; 408/237
(58) Field of Search ......................... 408/38, 36, 37, 408/43, 53, 88, 124, 150, 236, 237; 409/202, 211; 475/331

(56) References Cited

U.S. PATENT DOCUMENTS 4,215,958 A * 8/1980 Jagers ........................ 408/38
4,888,865 A * 12/1989 Okada et al. ................ 409/211

FOREIGN PATENT DOCUMENTS

| DE | 29 01005 A | * 7/1980 | .................. 408/38 |
| EP | 0 845 317 | 11/1996 | |

* cited by examiner

Primary Examiner—Henry Tsai
Assistant Examiner—Terrence Washington
(74) Attorney, Agent, or Firm—Herbert Dubno; Andrew Wilford

(57) ABSTRACT

An apparatus for drilling structural shapes such as angles, I-beams and H-beams has sliders shiftable transversely to the beam along vertical and horizontal members of a frame through which the beam is passed. At least one of the sliders can have a rotatable carrier whose axis is perpendicular to the web or flange being drill and from which a respective drilling unit is radially offset. The longitudinal position of drilling is determined by the angular position of the carrier and any transverse offset is compensated by movement of the respective slider.

11 Claims, 3 Drawing Sheets

APPARATUS FOR MACHINING, ESPECIALLY DRILLING OF STRUCTURAL SHAPES

FIELD OF THE INVENTION

My present invention relates to an apparatus for the machining of structural shapes and, more particularly, for the drilling of structural shapes having at least two angularly-adjoining flanges and preferably flanges at a right angle to one another. The invention especially relates to an apparatus of the type in which the structural shape is passed through a portal or frame having vertical and horizontal members and in which along at least one of the vertical members and along the horizontal member, respective slides are provided which carry drilling heads or holders for drill bits or spindles for the drilling of holes in respective flanges. The structural shapes in question are also referred to as profiles, usually have two or more angularly adjoining flanges which may be at right angles, and include angles, I-beams, H-beams, T-beams and composites of these shapes.

BACKGROUND OF THE INVENTION

In steel fabrication, the structural shape must be precisely machined, i.e. drilled to provide holes through which bolts or rivets can be passed to allow an I-beam, H-beam or angle to be connected to another structural shape with or without fish plates or connecting members in erection of steel building structures, bridges, towers and the like. The holes or bores must correspond to a predetermined pattern to allow accurate connection of the structural shape with other members. If, of course, a transverse row of bores is provided, the structural shape may be weakened.

As a practical matter, when structural shapes are used in steel constructions under high load, the bores in the flanges at right angles to one another should be longitudinally offset to minimize the reduction in the load-carrying capacity of the resulting steel or girder, i.e. care should be that bores are not drilled in the various flanges in the same transverse plane.

The offset of bores along the structural shape in the longitudinal direction or along the longitudinal axis thereof is a spacing determined for the later use of the beam or girder and is chosen in accordance with the assembly plan. The distance is variable and can range, usually, to a maximum of several hundred millimeters.

An apparatus for drilling structural shapes is described in EP-B 0 845 317. In this system, the vertical drill unit and the horizontal drill unit located laterally thereof are fixed in position with respect to the longitudinal direction, i.e. the direction of advance of the workpiece through the frame or portal. The workpiece is moved stepwise through the apparatus and is drilled with the horizontal or vertical drilling units to locate the holes at the positions determined by the drilling plan. However, simultaneous drilling by the drilling units of this system is only possible when the bores are to lie in the same cross-sectional plane or are to have a constant axial (longitudinal) offset which is determined by the fixed orientations of the horizontal and vertical drilling units with respect to one another, the longitudinal direction corresponding to the direction of advance of the workpiece.

When the bores in the horizontal and vertical flanges are to have variable longitudinal spacings, the workpiece must always be repositioned to locate the drill bit at the desired point and separately drill the vertical and horizontal flanges. This need to separately drill most of the bores greatly reduces the efficiency and effectiveness of the apparatus and especially when bores of close spacing in the longitudinal direction are required and a number of bores close together in the longitudinal direction are to be made in the various flanges.

OBJECTS OF THE INVENTION

It is, therefore, the principal object of the present invention to provide an improved apparatus for the machining of structural shapes, especially the drilling thereof in which bores can be drilled substantially in two mutually perpendicular flanges but with a selected longitudinal offset so as to avoid weakening of the structural shape.

Another object is to provide an apparatus for the purposes described which avoids the drawbacks of the earlier systems.

Still another object of this invention is to provide an improved system for drilling structural shapes such as angles, I-beams and H-beams which has a greater output than has hitherto been the case and can avoid weakening of the structural shape.

A further object of the invention is to provide a more versatile drilling apparatus for structural shapes whereby a plurality of flanges of a structural shape can be simultaneously drilled with bores in a plurality of transverse rows with different longitudinal offsetting without the need to move the structural shape or piece.

SUMMARY OF THE INVENTION

These objects are achieved, in accordance with the invention in an apparatus for the machining of structural shapes having two flanges angularly adjoining at a right angle which comprises:

means forming a substantially horizontal transport path for structural shapes to be machined;

a frame along the path having at least one fixed vertical member and at least one fixed horizontal member;

a horizontally displaceable slide on the horizontal member and a vertically displaceable slide on the vertical member; and respective machining units on the slides for machining respective flanges of a structural shape on the path in the frame, and including at least one drill carrier rotatable on a respective one of the slides about a respective carrier axis transverse to the respective flange, and a holder for a drill bit on the respective carrier radially offset from the carrier axis and rotatable about a drill-bit axis, whereby holes can be drilled by the drill bit at different longitudinal locations along the respective flange upon rotation of the carrier about the carrier axis and at different transverse locations on the respective flange upon displacement of the one of the slides.

According to the invention, the one of the slides and the carrier have respective drives, the apparatus further comprising a controller for the drives for operating the drive of the one of the slides to compensate for a transverse shift of the drill bit upon rotation of the carrier about the carrier axis to obtain a certain longitudinal spacing of the holes.

The carrier can be provided with a plurality of holders for respective drill bits offset radially from the carrier axis and angularly spaced therearound, the drill bits being displaceable selectively into working position for drilling the one of the flanges.

With an apparatus in accordance with the invention, the drilling unit on at last one of the slides is mounted on a rotating carrier with a respective servomotor or positioning drive and the drill bit or holder (spindle) is eccentrically arranged on this carrier, the spindle axis being parallel to the carrier axis. The position of the drill bit in the longitudinal direction can thus be set by the angular position of the carrier while the position in a transverse direction is set by the respective slide so that a compound motion of the slide and carrier can locate the drill bit at any location within range offered by the rotation of the carrier notwithstanding the fact that the slide is guided along a guide which is fixed in the longitudinal direction of the workpiece.

The carriers can be provided on the slides displaceably along both of the vertical limbs or members of the frame or portal and each of these carriers can have a horizontal drilling unit. The slide displaceably horizontally along the traverse of the frame can likewise be equipped with a rotatable carrier and a drill which is radially offset on the carrier form the axis of rotation thereof.

Upon a rotation of the carrier, the drill holder is displaced along a circular path or arc about the axis of rotation of the carrier. The axial displacement offered by the rotation of the carrier will depend on the diameter of this circle which can be several hundred millimeters without difficulty. Within this range the axial position is determined by the angular displacement of the carrier in a stepless manner.

The circular movement of the drill is associated with a transverse displacement which can be compensated by the movement of the respective slide so that the drill bit can be located at exactly the desired position. The carrier drive and the slide drive can be connected to a controller which automatically compensates for the lateral offset by adjusting the respective slider.

The number of drilling heads can be provided eccentrically on the or each carrier and can be selectively brought into working position by rotation of the carrier. A common drive for all of the spindles on a carrier can be provided for the or each carrier.

According to a feature of the invention, the drill carrier is provided with a planetary gear drive or transmission which includes a sun gear, a planet gear with planet gears and an outer gear or ring gear. The drill carrier is connected with the planet carrier and the angular setting of the planet carrier is achieved with a stepping motor connected with the sun gear or the ring tear and which positions the planet carrier and the drill carrier in the desired angular position. The planet gear can be locked by its positioning drive, i.e. the stepping motor, in its working angular position.

It is also advantageous to provide a rotary drive for the spindles on the planet carrier which can rotatably drive the drills via the sun gear. When the planet gear is stationary, the sun gear rotates the planet gears and via the planet gears the spindles of the drilling units. The transmission can include gearing between the planet gears and the spindles to allow these to be rotated at different speeds form one another.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
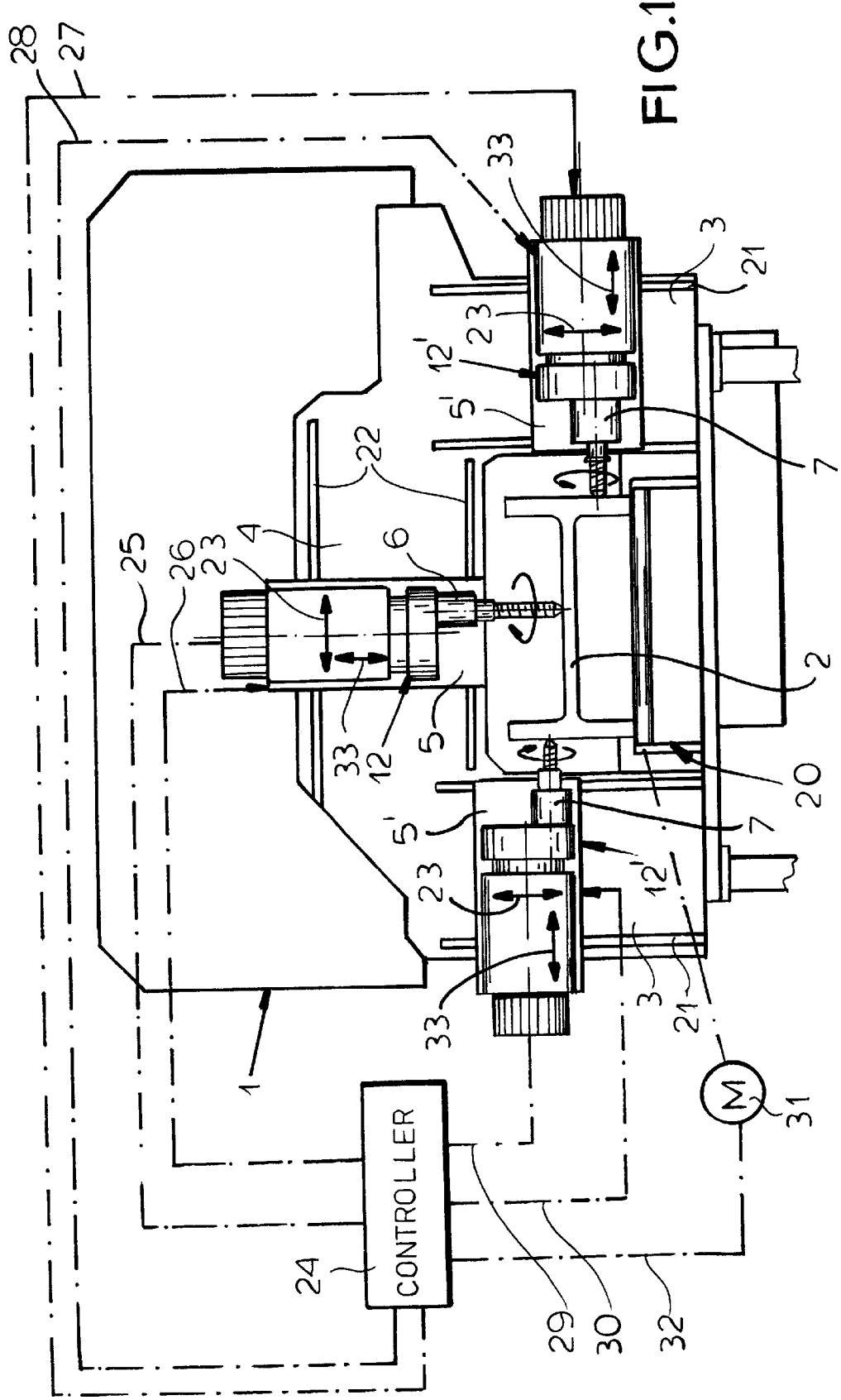
FIG. 1 is a front elevational view, in highly diagrammatic form, of a drilling apparatus with horizontal and vertical drilling units for structural shapes according to the invention.

The basic construction of an apparatus according to the invention is shown in FIG. 1. The apparatus comprises a portal or frame 1 which is provided with a transporter or conveyor 20 for the structural shapes 2 to be drilled. Straddling this conveyor 20 which defines a transport path perpendicular to the plane of the paper in FIG. 1, the frame comprises a pair of uprights 3 with guides 21 for vertically displaceable sliders 5'.

The device or horizontal member 4 of the frame is provided with guides 22 for a horizontally shiftable slider 5. The vertical slides 5' carry the horizontal drilling units 12' while the horizontally shiftable slide 5 carries the vertical drilling unit 12.

Figure 2:
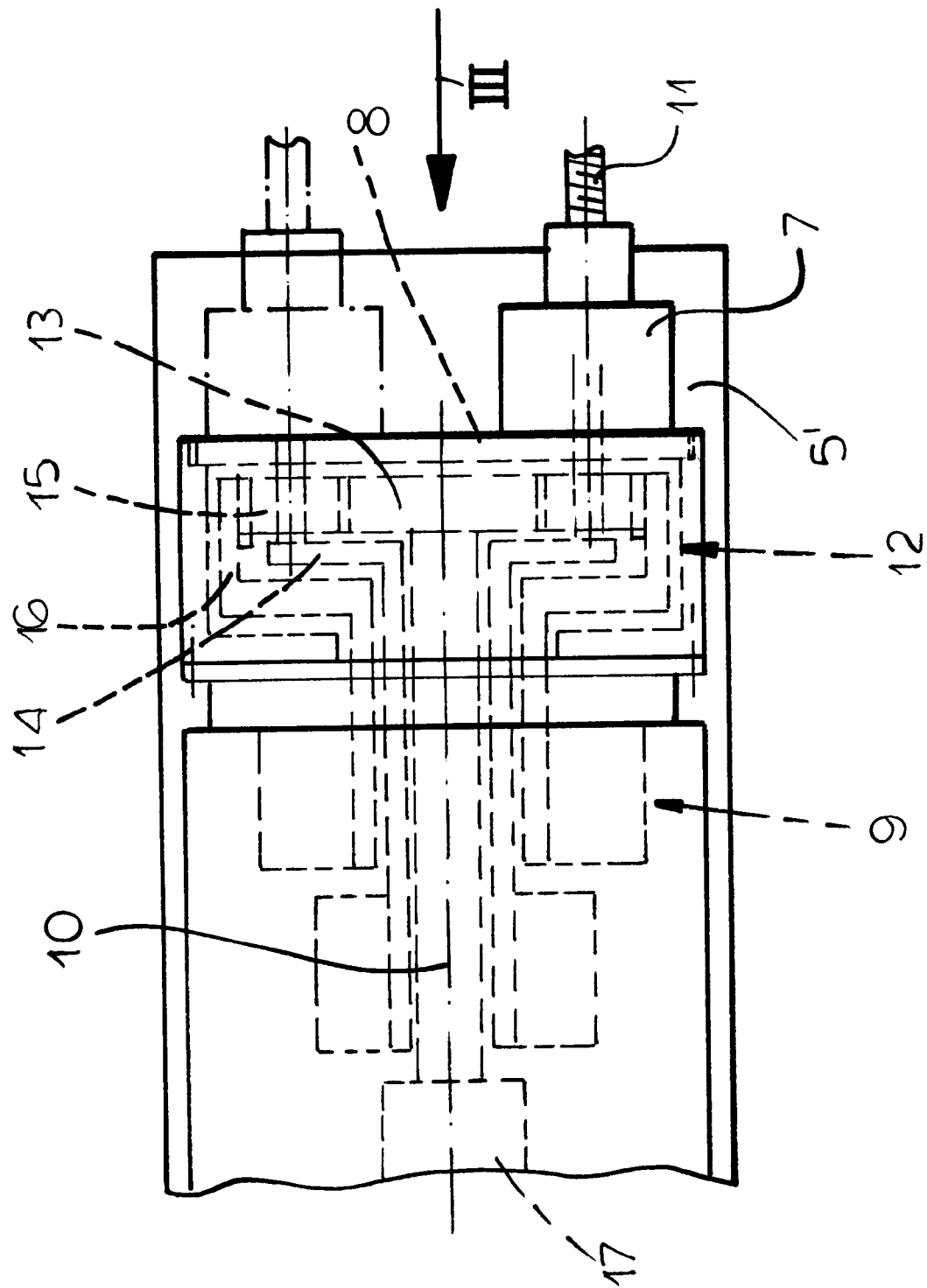
FIG. 2 is a view greatly enlarged relative to FIG. 1 and highly simplified showing the drive for a horizontal drilling unit of the apparatus of FIG. 1.
Figure 3:
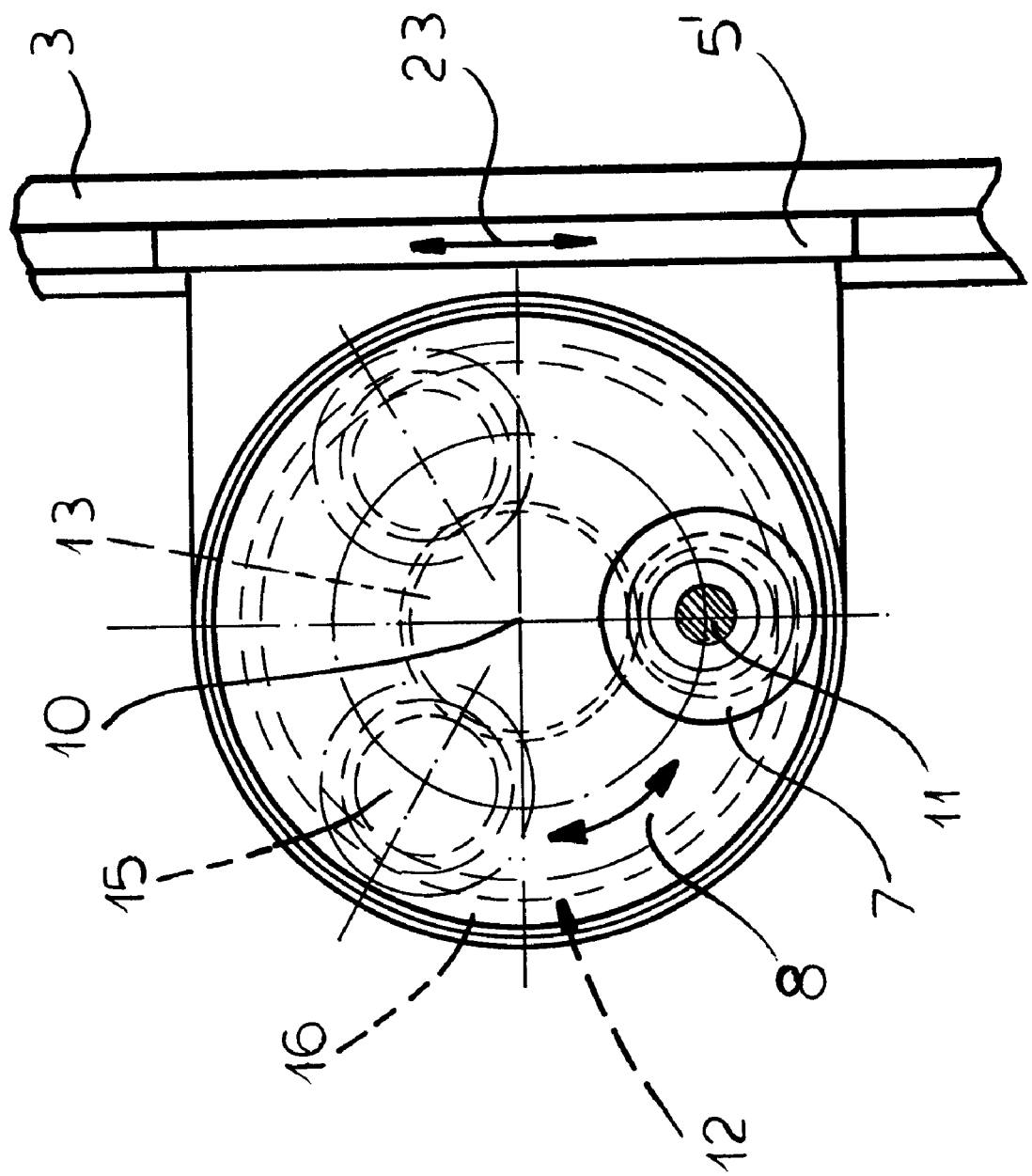
FIG. 3 is a view in the direction of the arrow III of FIG. 2.

As can be seen from FIG. 1 and in greater detail in FIGS. 2 and 3, a slide, such as one of the vertically-shiftable slides 5' and preferably all of the slides, can have a rotatable drill carrier 8 with a positioning drive which has been represented diagrammatically at 9 and can set the angular position of that carrier about the carrier axis 10. The spindles or drill bits 11 with the respective drilling units 7 are offset radially outwardly form the carrier axis 10. The drilling units 7 are angularly displaced about the axis 10 to set the position of the drill bit in the longitudinal direction which is perpendicular to the plane of the paper in FIG. 1 of the structural shape 2 to be drilled. The position of the drill bit in the transverse direction is controlled by the action of the positioning drive for the respective slide as represented by the double-headed arrows 23 in FIG. 1 and FIG. 3.

Because of the circular movement of the drilling unit 7 around the axis of rotation 10 of the carrier 8, there is an offset of the drill bit 11 transverse to the longitudinal direction. This offset is compensated by the movement of the respective slide as shown by the arrows 23. For this purpose a controller 24 is provided which delivers outputs 25 and 26 or 27 and 28 or 29 and 30 for the respective positioning drive 9 and the slider drive, thereby setting the angular position of the respective carrier and displacing the slide for the compensation of the transverse offset. The controller 24 can also control the position of the workpiece via the conveyor drive 31 and the line 32 and can be programmed to provide the desired drilling program.

Each of the drilling units can additionally be moved toward and away from the respective flange or the web of the structural shape as represented by the arrows 33 to effect the drilling operation, all via the controller 24, and the drill bits can be driven by the respective motors 17.

From FIGS. 2 and 3, it will be apparent that the drill carrier 8 is provided with a planetary transmission which includes a sun gear 13, a planet carrier 14, planet gears 15 on the planet carrier 14 and meshing with the sun gear, and an outer gear or ring gear 16 with which the planets also mesh. The positioning drive 9 controls the angular position of the-planet carrier 14 and can be in the form of a stepping motor controlled, of course, by the controller 24. As the planet carrier 14 rotates, the sun gear is stationary. When the working position of the drill bit carried by the carrier 8 connected to the planet carrier 14 is reached, the planet gear 14 is locked in place and a brake (not shown) for the sun gear 13 is released. The sun gear 13 is then driven by a rotatable drive 17, e.g. a drill drive motor, and this drive is coupled to the drilling unit 7 via the respective planet gear 15. Each spindle 11 is thus driven directly by the respective planet gear 15 or indirectly through a transmission by the respective planet gear 15.

While in the drawing provided only a single drilling unit is shown to be provided on each carrier 8, from FIG. 2, especially as shown by dot-dash lines, it will be apparent that a plurality of drilling units can be provided on each carrier which can be alternatively or sequentially brought into working position. The rotatable drive 17 can then be coupled to all of the spindles of these drilling units via the sun gear and the respective planet gears. Depending upon the gear ratio of any transmission between the respective planet gear and the spindle, the speed of the drills on a respective carrier an be the same or different.

I claim:

1. An apparatus for machining a structural shape having angularly adjoining horizontal and vertical flanges, said apparatus comprising:
    means forming a substantially horizontal transport path for the structural shape to be machined;
    a frame along the path having at least one fixed vertical member and at least one fixed horizontal member extending generally parallel to the respective flanges;
    a horizontally displaceable slide on the horizontal member;
    a vertically displaceable slide on the vertical member; and
    respective machining units on the slides for machining the respective flanges of the structural shape on the path in the frame, and including
        a drill carrier rotatable on one of the slides about a respective carrier axis transverse to the respective flange, and
        a plurality of holders for a drill bits on the carrier radially offset from the carrier axis and rotatable about respective drill-bit axes angularly spaced around the carrier axis,
    whereby the holders can be set to drill holes in the respective flange at different longitudinal locations along the respective flange upon rotation of the carrier about the respective carrier axis and at different transverse locations on the respective flange on displacement of the one slide along the respective member.

2. The apparatus defined in claim 1 wherein the one of the slides and the carrier have respective drives, the apparatus further comprising a controller for the drives for operating the drive of the one of the slides to compensate for a transverse shift of the drill bit upon rotation of the carrier about the carrier axis to obtain a certain longitudinal spacing of the holes.

3. The apparatus defined in claim 1, further comprising a common rotary drive for all of the holders on the carrier.

4. The apparatus defined in claim 1 wherein each of the slides has a respective drill carrier with a respective holder, the carrier axes being transverse to the respective flanges.

5. The apparatus defined in claim 4, further comprising
    respective drives for each of the slides and each of the carriers; and
    means including a controller connected to the drives for operating the drive of each slide to compensate for a transverse shift of the respective drill bit on rotation of the respective carrier about its carrier axis to obtain a certain longitudinal spacing of the drilled holes.

6. An apparatus for machining a structural shape having angularly adjoining horizontal and vertical flanges, the apparatus comprising:
    means forming a substantially horizontal transport path for the structural shape to be machined;
    a frame along the path having at least one fixed vertical member and at least one fixed horizontal member extending generally parallel to the respective flanges;
    a horizontally displaceable slide on the horizontal member;
    a vertically displaceable slide on the vertical member; and
    respective machining units on the slides for machining the respective flanges of the structural shape on the path in the frame, and including
        a drill carrier rotatable on one of the slides about a respective carrier axis transverse to the respective flange,
        a respective holder for a respective drill bit on the carrier radially offset from the carrier axis and rotatable about a respective drill-bit axis,
        a planetary transmission having a sun gear, a planet carrier having planet gears meshing with the sun gear, and a ring gear meshing with the planet gears; and
        a stepping motor connected with either the sun gear or the ring gear and setting an angular position of the carrier about the carrier axis,
    whereby the holder can be set to drill holes in the respective flange at different longitudinal locations along the respective flange upon rotation of the carrier about the respective carrier axis and at different transverse locations on the respective flange on displacement of the one slide along the respective member.

7. The apparatus defined in claim 6 wherein the angular position is fixed by locking of planet carrier, the holder being thereafter rotated to drill a hole by rotation of the sun gear to drive a respective one of the planet gears.

8. An apparatus for machining a structural shape having angularly adjoining horizontal and vertical flanges, the apparatus comprising:
    means forming a substantially horizontal transport path for the structural shape to be machined;
    a frame along the path having at least one fixed vertical member and at least one fixed horizontal member extending generally parallel to the respective flanges;
    a horizontally displaceable slide on the horizontal member;
    a vertically displaceable slide on the vertical member; and
    respective machining units on the slides for machining the respective flanges of the structural shape on the path in the frame, and each including
        a respective drill carrier rotatable on the respective slide about a respective carrier axis transverse to the respective flange, and
        a plurality of holders for respective drill bits on each carrier radially offset from the carrier axis and rotatable about respective drill-bit axes, the carrier axes being transverse to the respective flanges, the drill-bit axes being angularly spaced about the respective carrier axis,
    respective drives for each of the slides and each of the carriers; and
    means including a controller connected to the drives for operating the drive of each slide to compensate for a transverse shift of the respective drill bit on rotation of the respective carrier about its carrier axis to obtain a certain longitudinal spacing of the drilled holes,
    whereby the holder can be set to drill holes in the respective flange at different longitudinal locations along the respective flange upon rotation of the carrier about the respective carrier axis and at different transverse locations on the respective flange on displacement of the one slide along the respective member.

9. The apparatus defined in claim 8, further comprising a common rotary drive for all of the holders on each of the carriers.

10. An apparatus for machining a structural shape having angularly adjoining horizontal and vertical flanges, the apparatus comprising:

means forming a substantially horizontal transport path for the structural shape to be machined;

a frame along the path having at least one fixed vertical member and at least one fixed horizontal member extending generally parallel to the respective flanges;

a horizontally displaceable slide on the horizontal member;

a vertically displaceable slide on the vertical member; and respective machining units on the slides for machining the respective flanges of the structural shape on the path in the frame, and each including a respective drill carrier rotatable on the respective slide about a respective carrier axis transverse to the respective flange, and a respective holder for a respective drill bit on each carrier radially offset from the carrier axis and rotatable about a respective drill-bit axis, the carrier axes being transverse to the respective flanges, respective drives for each of the slides and each of the carriers;

means including a controller connected to the drives for operating the drive of each slide to compensate for a transverse shift of the respective drill bit on rotation of the respective carrier about its carrier axis to obtain a certain longitudinal spacing of the drilled holes, a planetary transmission having a sun gear, a planet carrier having planet gears meshing with the sun gear, and a ring gear meshing with the planet gears; and a stepping motor connected with either the sun gear or the ring gear and setting an angular position of the carrier about the carrier axis, whereby the holder can be set to drill holes in the respective flange at different longitudinal locations along the respective flange upon rotation of the carrier about the respective carrier axis and at different transverse locations on the respective flange on displacement of the one slide along the respective member.

11. The apparatus defined in claim 10 wherein the angular position of each drill bit about the respective carrier axis is fixed by locking of the planet carrier of the respective planetary transmission, the respective holder being thereafter rotated to drill a hole by rotation of the respective sun gear to drive a respective one of the planet gears.

* * * * *